United States Patent [19]

Ikeda

[11] Patent Number: 5,590,578

[45] Date of Patent: Jan. 7, 1997

[54] MUFFLER FOR BOOSTER

[75] Inventor: Masahiro Ikeda, Saitama-ken, Japan

[73] Assignee: Jidosha Kiki Co., Ltd., Tokyo, Japan

[21] Appl. No.: 381,220

[22] Filed: Jan. 31, 1995

[30] Foreign Application Priority Data

Feb. 28, 1994 [JP] Japan .................. 6-054739
Mar. 31, 1994 [JP] Japan .................. 6-085788

[51] Int. Cl.⁶ .......................................... F15B 9/10
[52] U.S. Cl. ......................................... 91/376 R
[58] Field of Search ............................. 91/376 R

[56] References Cited

U.S. PATENT DOCUMENTS

| | | | |
|---|---|---|---|
| 3,387,540 | 6/1968 | Wilson | 91/376 R |
| 4,005,638 | 2/1977 | Takeuchi | 91/369 B |
| 4,069,742 | 1/1978 | Gephart et al. | 91/376 R |
| 4,716,814 | 1/1988 | Yamakoshi | 91/376 R |
| 4,970,939 | 11/1990 | Fecher et al. | 91/376 R |
| 5,046,399 | 10/1991 | Koshimizu | 91/376 R |
| 5,367,941 | 11/1994 | Gautier et al. | 91/369.2 |
| 5,433,135 | 7/1995 | Watanabe | 91/376 R |

FOREIGN PATENT DOCUMENTS

| | | |
|---|---|---|
| 1-70672 | 5/1989 | Japan . |
| 6-87123 | 12/1994 | Japan . |
| 2148427 | 5/1985 | United Kingdom . |

*Primary Examiner*—F. Daniel Lopez
*Attorney, Agent, or Firm*—Flynn, Thiel, Boutell & Tanis, P.C.

[57] ABSTRACT

A booster as may be used in a brake of an automobile is disclosed, which permits the generation of sounds during the suction stroke when pressure fluid is introduced into a variable pressure chamber to be reduced. The inner surface of a valve body, which defines the variable pressure passage is formed as an uneven surface. This improves the muffler effect without degrading the response of the booster.

8 Claims, 8 Drawing Sheets

MUFFLER FOR BOOSTER

FIELD OF THE INVENTION

The invention relates to a booster as may be used in a brake of an automobile, for example, and more particularly, to a muffler for booster which reduces the generation of acoustic sounds as a pressure fluid is introduced into a variable pressure chamber of the booster.

BACKGROUND OF THE PRIOR ART

A booster is known in the art which comprises a tubular valve body slidably disposed within a shell, an annular, first valve seat formed around the inner peripheral surface of the valve body, a valve plunger slidably fitted inside the valve body, an annular, second valve seat formed on the valve plunger, a valve element which is urged by a spring disposed within the valve body so as to be seated upon either the first or the second valve seat, a constant pressure passage providing a communication between a portion which is located radially outward of a first seat defined by the contact between the first valve seat and the valve element and a constant pressure chamber which is partitioned within the shell, a pressure passage for providing a communication between a portion which is located radially inward of a second seat defined by the contact between the second valve seat and the valve element and a source of pressure fluid, and a variable pressure passage for providing a communication between a portion located intermediate the first and the second seat and a variable pressure chamber which is also partitioned within the shell.

In the inoperative condition of the booster described above, the valve plunger is retracted to cause the valve element to be seated upon the second valve seat and to be spaced from the first valve seat. Under this condition, the second seat defined by the contact between the second valve seat and the valve element is closed to thereby close the pressure passage which communicates with the internal portion thereof while the first seat defined by the contact between the first valve seat and the valve element is opened to allow a communication between the constant pressure passage, located outside the first seat, and the variable pressure passage, located inside the first seat. In this manner, the constant pressure chamber communicating with the constant pressure passage and the variable pressure chamber communicating with the variable pressure passage assume an equal pressure, whereby the booster is inoperative.

By contrast, when the booster is operated, the depression of a pedal causes the valve plunger to be advanced, whereupon the valve element is seated upon the first valve seat to close the first seat, thus interrupting a communication between the constant and the variable pressure chamber. A continued advancement of the valve plunger causes the valve element to be removed from the second valve seat to open the second seat, whereupon the pressure passage, located inside the second seat, communicates with the variable pressure passage, located outside the second seat, allowing pressure fluid to be introduced into the variable pressure chamber to create a pressure differential between the constant and the variable pressure chamber to operate the booster.

When the booster is operated, that is, when pressure fluid is introduced into the variable pressure chamber through the pressure passage, sounds may be acoustically generated. To accommodate for this, it has been a practice to provide an acoustic absorbing material adjacent the inlet of the pressure passage to present a resistance to the passage of pressure fluid therethrough in an attempt to reduce the rate at which the pressure fluid is introduced into the variable pressure chamber in order to suppress the generation of sounds. However, such muffler suffers from a disadvantage that the response of the booster is degraded inasmuch as the provision of the acoustic absorbing material within the pressure passage presents a resistance to the passage of pressure fluid therethrough.

SUMMARY OF THE INVENTION

In view of the foregoing, the invention provides a muffler for booster which is capable of reducing the generation of sounds during the suction stroke without compromising the response of the booster. Specifically, in accordance with the invention, an uneven surface is formed in the internal surface of the variable pressure passage of the booster. It is confirmed that the provision of the uneven surface formed within the variable pressure passage reduces the generation of acoustic sounds during the suction stroke as compared with a conventional arrangement having no uneven surface. Such uneven surface presents no resistance to the passage of pressure fluid through the pressure passage as compared with an arrangement having an acoustic absorbing material disposed therein, thus preventing any compromising effect upon the response.

Above and other objects, features and advantages of the invention will become apparent from the following description of several embodiments thereof with reference to the attached drawings.

DETAILED DESCRIPTION OF EMBODIMENTS

Figure 1:
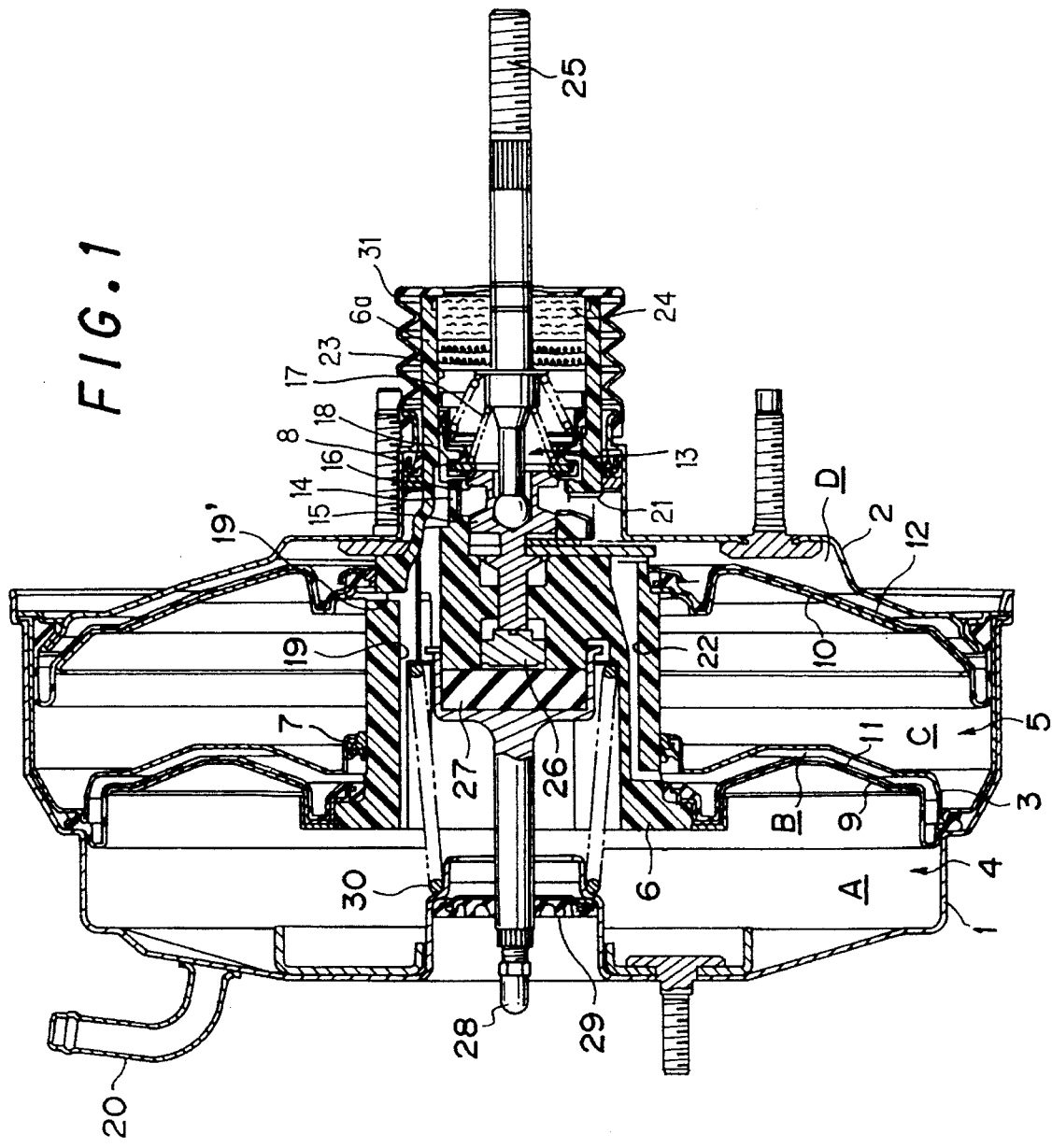
FIG. 1 is a longitudinal section of one embodiment of the invention.

Referring to the drawings, several embodiments of the invention will be described. Initially referring to FIG. 1, an enclosed vessel consists of a front shell 1 and a rear shell 2, and a center plate 3 which is disposed centrally therein partitions the interior into a pair of front chamber 4 and rear chamber 5. A substantially tubular valve body 6 slidably extends through axial portions of the rear shell 2 and the center plate 3 and are hermetically sealed by annular seal members 7 and 8, respectively, thereagainst.

A front power piston 9 and a rear power piston 10, which are disposed within the front chamber 4 and the rear chamber 5, respectively, are connected to the valve body 6, and a front diaphragm 11 and a rear diaphragm 12 are applied to the back surfaces of the power pistons 9 and 10, respectively, thus defining a constant pressure chamber A and a variable pressure chamber B across the front diaphragm 11 and a constant pressure chamber C and a variable pressure chamber D across the rear diaphragm 12.

A valve mechanism 13 which switches a fluid circuit between the pair of constant pressure chambers A, C and the pair of variable pressure chambers B, D is disposed within the valve body 6. Specifically, the valve mechanism 13 comprises an annular, first valve seat 14 formed around the inner peripheral surface of the valve body 6, an annular, second valve seat 16 which is disposed radially inward of the first valve seat 14 and formed on the right end of a valve plunger 15 which is slidably disposed within the valve body 6, and a valve element 18 which is urged from the right hand side, as viewed in FIG. 1, by a spring 17 so as to be seated upon either valve seat 14 or 16.

A space located radially outward of a first annular seat defined by the contact between the first valve seat 14 and the valve element 18 communicates with the constant pressure chambers A and C through axial constant pressure passages 19 and 19' which are formed in the valve body 6, and the constant pressure chamber A communicates with an intake manifold of an engine through a tubing 20 which introduces a negative pressure.

A space located radially inward of the first annular seat defined by the contact between the first valve seat 14 and the valve element 18, but located radially outward of a second annular seat defined by the contact between the second valve seat 16 and the valve element 18, or the space located intermediate the first and the second seat communicates with the variable pressure chamber D through a variable pressure passage 21 formed in the valve body 6. The variable pressure chamber D in turn communicates with the variable pressure chamber, B through an axial variable pressure passage 22 also formed in the valve body 6.

Finally, a space located radially inward of the second or inner seat defined by the contact between the second valve seat 16 and the valve element 18 communicates with the atmosphere, serving as a source of pressure fluid, through a pressure passage 23 in which a filter 24 is disposed.

The right end of the valve plunger 15 is pivotally connected with the end of an input shaft 25, the other end of which is connected to a brake pedal, not shown. On the other hand, a plunger plate 26 and a reaction disc 27 are sequentially disposed to the left of the valve plunger 15, and the reaction disc 27 is fitted in the right end of a push rod 28.

The left end of the push rod 28 slidably extends through the axial portion of the front shell 1, with a seal member 29 disposed therebetween, to the outside of the shell for connection with a piston of a master cylinder, not shown. The valve body 6 is normally maintained in its inoperative position shown by a return spring 30.

The valve body 6 includes a tubular terminal end 6a which projects through an opening in the rear shell 2 in the axially rearward direction, and is covered by a dust cover 31 formed of rubber at a location outside the opening.

The described arrangement is identical to a known arrangement of a conventional booster.

Figure 2:
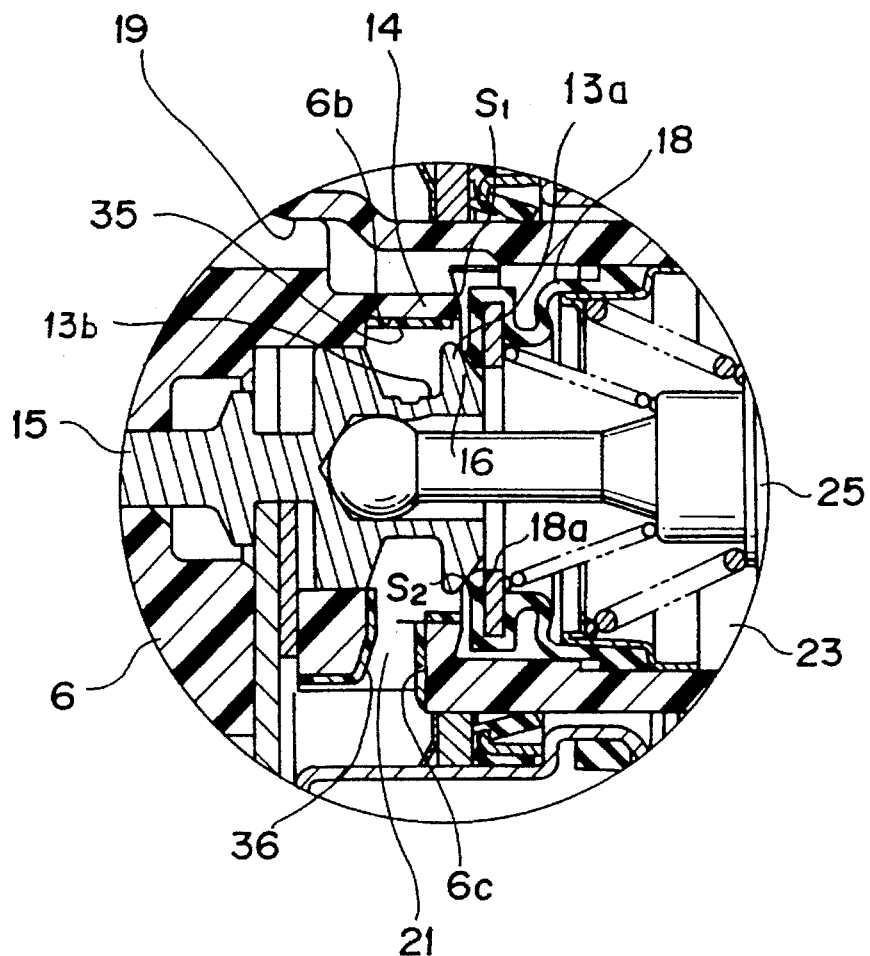
FIG. 2 is a cross section of part shown in FIG. 1 to an enlarged scale.

As shown to an enlarged scale in FIG. 2, the valve plunger 13 includes an annular flange 13a which defines the second valve seat 16 and a reduced diameter portion 13b which is disposed forwardly adjacent the annular flange 13a. In addition, the second valve seat 16 is formed into a spherical or arcuate surface, upon which an annular bulge 18a which is formed around the inner periphery of the valve element 18 is adapted to be seated. Accordingly, the contact between the second valve seat 16 and the annular bulge 18a of the valve element 18 defines a second seat $S_2$, and as referenced to the second seat $S_2$, the radially inside thereof provides the pressure passage 23 while the radially outside provides the variable pressure passage 21.

On the other hand, a first seat $S_1$ is annularly defined by the contact between the first valve seat 14 and the valve element 18, and as referenced to the first seat $S_1$, the radially outside thereof provides the constant pressure passage 19 while the radially inside provides the variable pressure passage 21. It will be seen that the variable pressure passage 21 extends forwardly from a location intermediate the first seat $S_1$ and the second seat $S_2$, and is defined by an inner surface 6b of the valve body 6 which extends axially forward from the first valve seat 14 and which is circular in section, and an inner surface 6c of the valve body 6 which extends radially outward and which is square-shaped in section.

A covering 35 of synthetic resin is fitted over the inner surface 6b of the valve body 6 and is integrally secured thereto, while a covering 36 of synthetic resin is fitted over the inner surface 6c of the valve body 6 and is integrally secured thereto. These coverings 35, 36 are tubular in configuration and are circular or square-shaped in section in accordance with the configuration of the inner surfaces 6b and 6c.

Figure 3:
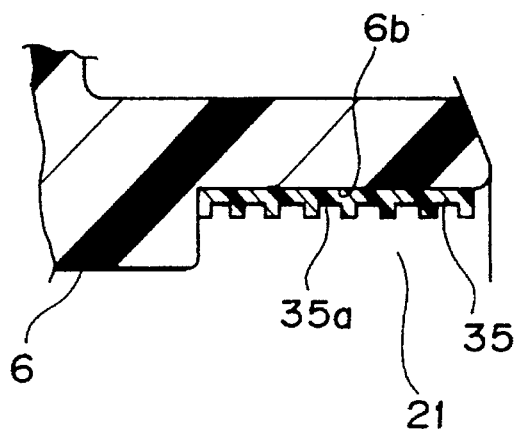
FIG. 3 is an enlarged cross section of part shown in FIG. 2.

As indicated in FIG. 3, the inner surface of each covering 35 or 36 is formed with a multitude of annular grooves 35a therein to provide an uneven surface. In the embodiment shown, the annular grooves 35a extend in a direction orthogonal to the direction in which the atmosphere passes, but may be formed to extend in a direction parallel to the direction of the passage of the atmosphere or at an angle thereto. Alternatively, it may be formed in grid-like configuration or the uneven surface may be irregularly shaped or formed at random.

Operation

In operation, when a brake pedal, not shown, is depressed to cause the input shaft 25 and its connected valve plunger 15 to advance in an integral manner, the valve element 18 also advances integrally while being seated upon the second valve seat 16 until the valve element 18 is seated upon the first valve seat 14 on the valve body 6 to interrupt the communication between the variable pressure passages 21 and 22 and the constant pressure passages 19 and 19'.

A continued advancement of the input shaft 25 and the valve plunger 15 causes the valve element 18, which is now seated upon the first valve seat 14 and is prevented from advancing further forward, is removed from the second valve seat 16, whereupon pressure fluid is introduced from the pressure passage 23 into the variable pressure chambers B and D through the constant pressure passages 21 and 22.

At this time, the provision of the coverings 35, 36 over the inner surfaces 6b, 6c of the variable pressure passage 21 formed in the valve body 6 and having the inner surfaces which are formed as uneven surfaces are effective to reduce the generation of acoustic sounds as the pressure fluid passes through such region.

Figure 4:
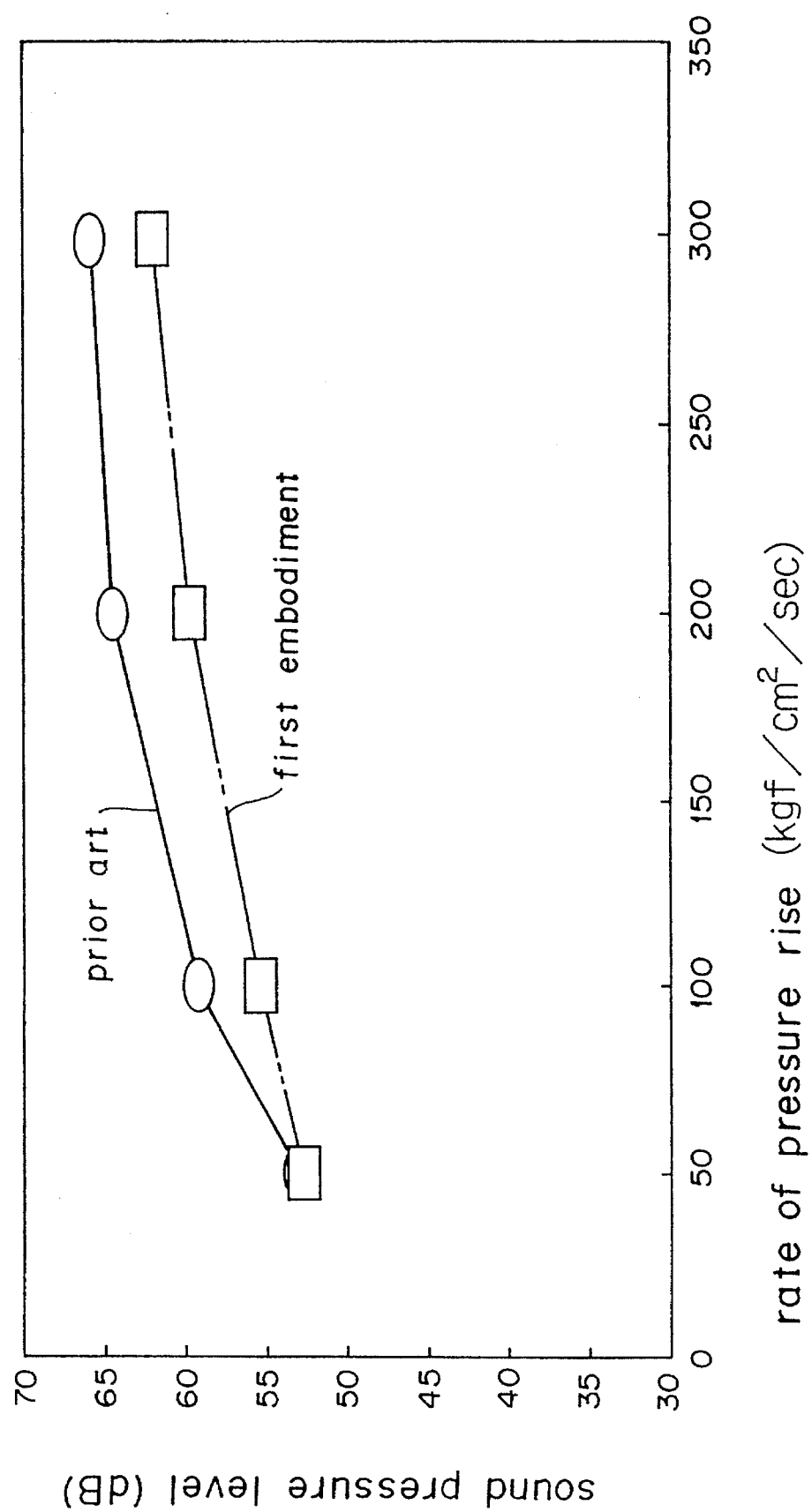
FIG. 4 is a graphical illustration of comparison between the present invention and a conventional arrangement of the generation of acoustic sounds generated during the suction stroke, as measured in terms of sound pressure level.

FIG. 4 graphically illustrates results of experiments which are conducted upon a booster constructed according to the described embodiment of the invention and a conventional booster having smooth inner surfaces 6b, 6c without the coverings 35, 36 to measure the actual generation of acoustic sounds. Measured values obtained from the booster according to the invention are indicated by squares, which are joined by a two-dot phantom line. Measured values obtained from the conventional booster are indicated by circles, which are joined together by a solid line.

In this Figure, it will be noted that when the rate of pressure rise is equal to 50 kgf/cm²/sec, the sound pressure level produced from the booster of the present embodiment is equal to 52.7 dB while the sound pressure level from the conventional booster is equal to 53.0 dB. When the rate of pressure rise increases to 100 kgf/cm²/sec, the sound pressure level of the booster of the present embodiment rises to 55.4 dB, while the sound pressure level of the conventional booster rises to 59.2 dB. At higher rates of pressure rise of 200 and 300 kgf/cm²/sec, respectively, the sound pressure level in the booster of the invention are 59.7 and 62.0 dB, respectively, while the sound pressure level of the conventional booster is equal to 64.5 and 65.8 dB, respectively. It will be seen from the described result of experiment that the sound pressure level of the booster according to the invention exhibits a smaller value than that of the conventional booster. Since no acoustic absorbing material is disposed within the pressure passage in accordance with the invention, the response remains unchanged from a booster having a conventional construction, thus without degradation in the response.

Second Embodiment

Figure 5:
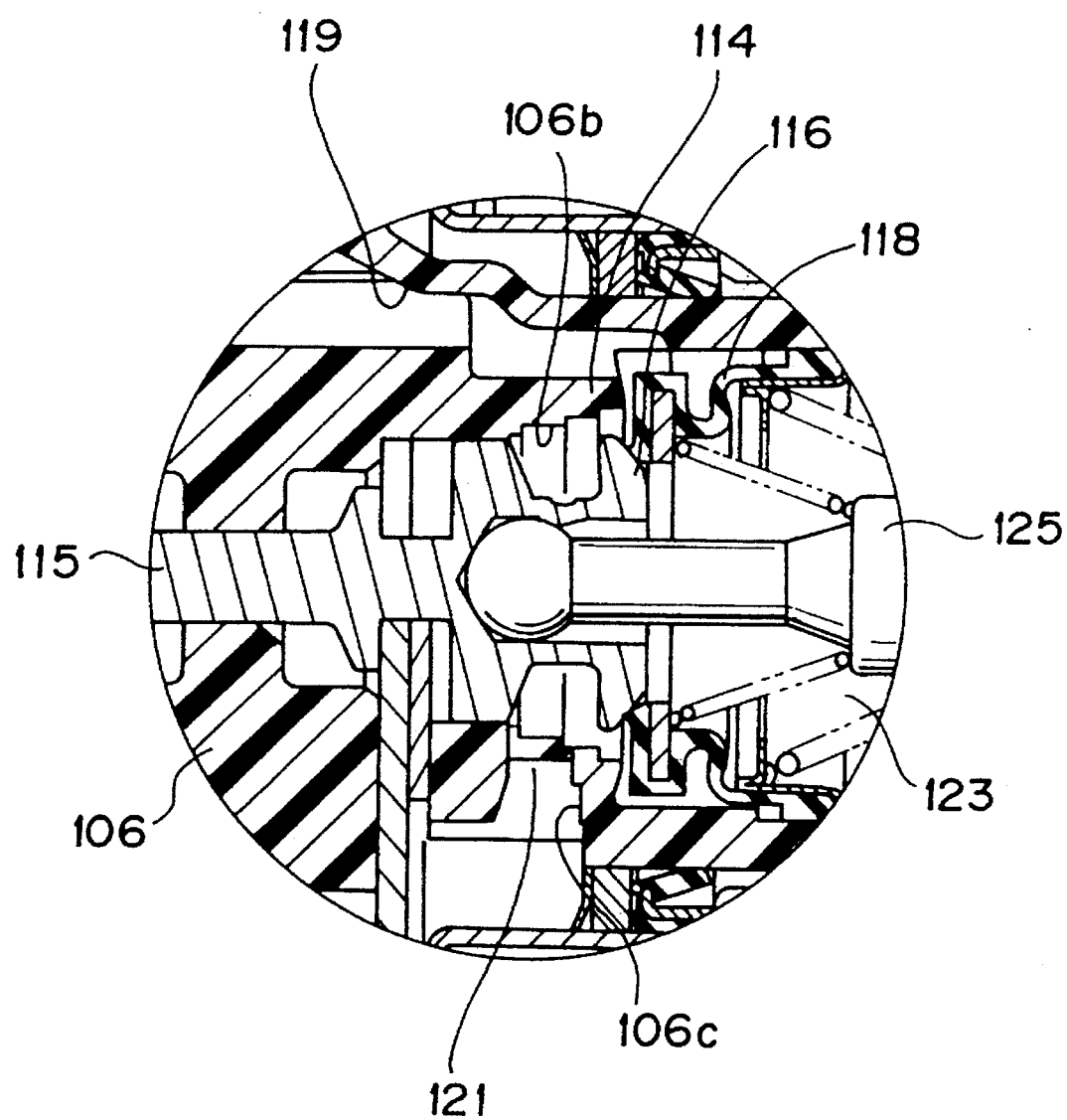
FIG. 5 is a cross section of a second embodiment of the invention.

FIG. 5 shows another embodiment of the invention. In this embodiment, a valve body 106 is formed with a variable pressure passage 121 having inner surfaces 106b, 106c in which a plurality of steps are formed, thereby providing uneven surfaces. The plurality of steps are formed in the valve body 6 by utilizing a corresponding draw mold, not shown, during the injection molding of the valve body 6 from synthetic resin to allow the mold to be withdrawn from the valve body. The internal diameters of the steps are sequentially increased in the drawing direction to permit the mold to be withdrawn from the valve body 106. In FIG. 5, numeral 114 represents a first valve seat, 115 a valve plunger, 116 a second valve seat, 118 a valve element, 119 a constant pressure passage, 123 a pressure passage, and 125 an input shaft.

Third Embodiment

Figure 6:
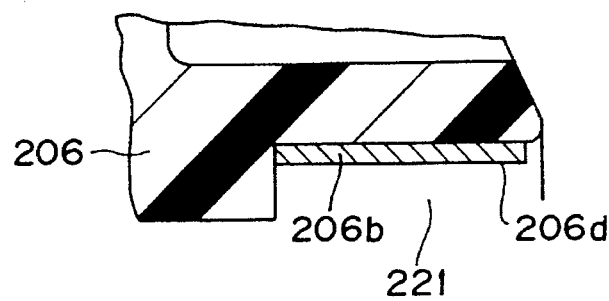
FIG. 6 is a cross section of a third embodiment of the invention.

As shown in FIG. 6, the outer periphery of the draw mold may be formed with a plurality of grooves in the draw direction, thereby forming a plurality of ribs 206d on an inner surface 206b of a variable pressure passage 221 formed in a valve body 206 so as to extend axially of the valve body 6 and at an equal spacing around the circumference of the inner surface 206d, thus presenting an uneven surface.

Other Embodiments

Figure 7:
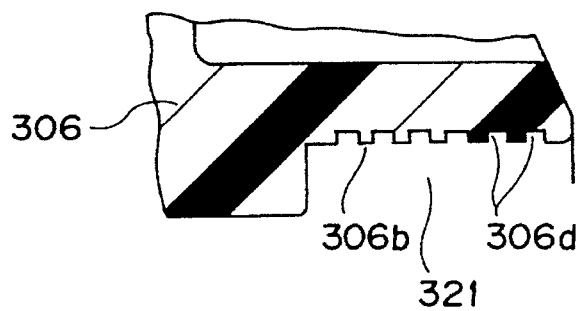
FIG. 7 is a cross section of a fourth embodiment of the invention.
Figure 8:
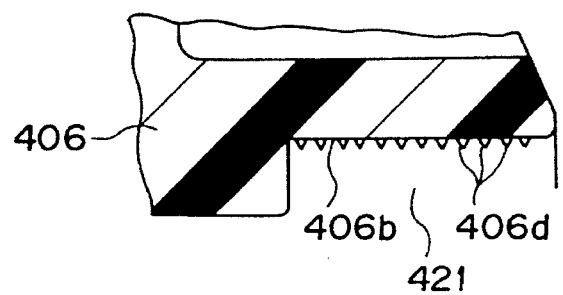
FIG. 8 is a cross section of a fifth embodiment of the invention.
Figure 9:
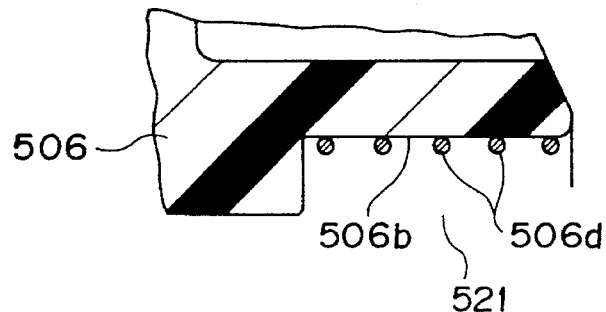
FIG. 9 is a cross section of a sixth embodiment of the invention.

Furthermore, as shown in FIG. 7, an uneven surface may be provided by cutting a spiral groove or an annular groove 306d directly in an inner surface 306b of a variable pressure passage 321 formed in a valve body 306. Alternatively, an uneven surface may be formed on an inner surface 406b of a variable pressure passage 421 formed in a valve body 406 by spraying synthetic resin 406d or the like, as shown in FIG. 8. Additionally, a coiled spring or a plurality of rings 506d may be placed as a pressure fit in an inner surface 506b of a variable pressure passage 521 formed in a valve body 506 to provide an uneven surface, as illustrated in FIG. 9.

In either instance, an uneven surface formed in this manner in the inner surface of the variable pressure passage functions a substantially similar effect as described above in connection with the first embodiment.

While an uneven surface has been described as being formed over the entire inner surface of the variable pressure passage in the described embodiments, such uneven surface may be formed only part of the inner surface of the variable pressure passage, for example, on only one of the inner surfaces 6b and 6c, depending on the muffler effect demanded.

Further Embodiment

Figure 10:
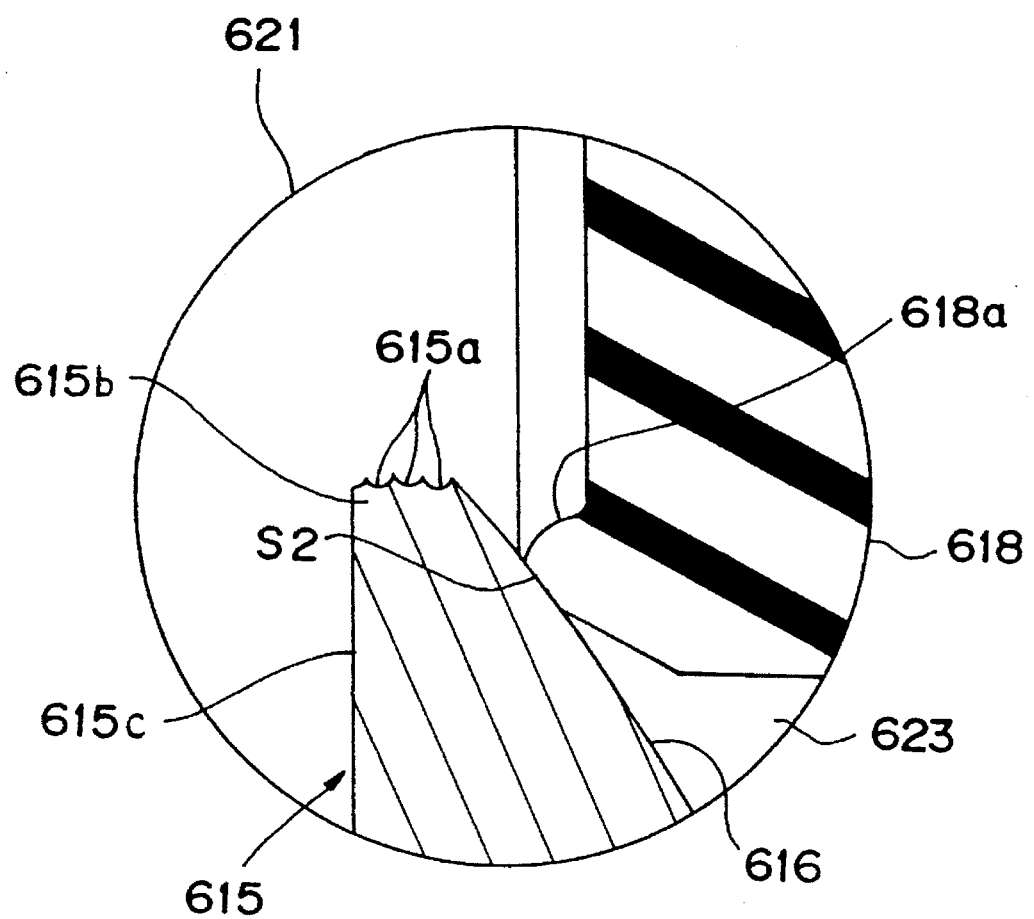
FIG. 10 is a cross section of part of a further embodiment of the invention.

In each embodiment described above, an uneven surface is formed on the inner surface of a valve body which defines a variable pressure passage. However, an uneven surface may be formed on the outer periphery of a valve plunger which faces the variable pressure passage. FIG. 10 shows such an embodiment. Specifically, in its outer periphery, a valve plunger 615 which faces a variable pressure passage 621 is formed with three circumferentially extending annular grooves 615a in an annular flange 615b at a location radially outward of a second seat $S_2$ and rearwardly adjacent a reduced diameter portion 615c of the valve plunger 615, these annular grooves defining an uneven surface. Again, the provision of these annular grooves in the valve plunger 615 is effective to reduce the generation of sounds produced as pressure fluid passes through the region of these grooves.

Figure 11:
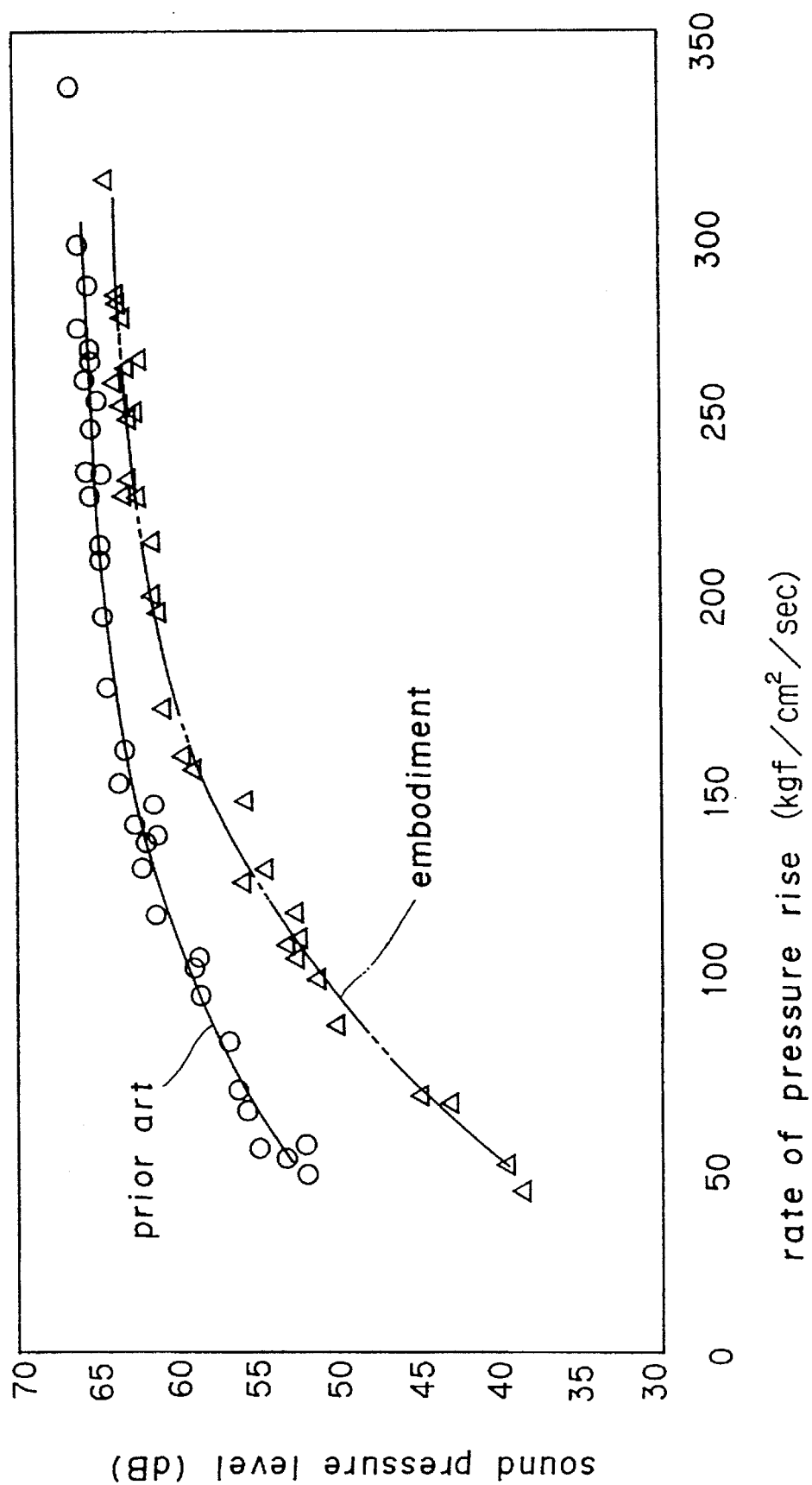
FIG. 11 is a graphical comparison between the embodiment shown in FIG. 10 and a conventional arrangement as measured in terms of sound pressure level.

FIG. 11 is a graphical comparison of results of experiments conducted on a booster according to the invention constructed in the manner illustrated in FIG. 10 and a conventional booster including a valve plunger 619 having a smooth surface instead of the annular grooves 615a. In this Figure, measured values obtained from the booster according to the invention and representing a sound pressure level are indicated by triangles which are joined together by two-dot phantom lines, while measured value obtained with the conventional booster are indicated by circles, which are joined together by a solid line. As will be appreciated, when the rate of pressure rise is equal to 50 kgf/cm²/sec, a sound pressure level produced by the booster of this embodiment is equal to 39.58 dB while a conventional booster produced a sound pressure level of 52.96 dB. At a rate of pressure rise of 100 kgf/cm²/sec, the booster of this embodiment produced a sound pressure level of 51.18 dB, compared against a conventional booster which produced 59.21 dB. At rates of pressure rise of 200 and 300 kgf/cm²/sec, respectively, the booster of the invention produced sound pressure levels of 61.79 and 61.23 dB, respectively, contrasted to the conventional booster which produced sound pressure levels of 64.49 and 65.83 dB, respectively.

It will be apparent from the described results of experiments that the generation of sounds generated during suction stroke of the booster according to the invention is less than that produced by a conventional booster, as measured in terms of sound pressure level. The elimination of use of acoustic absorbing material in the arrangement of the invention maintains the same level of response as in the conventional booster.

Still Another Embodiment

Figure 12:
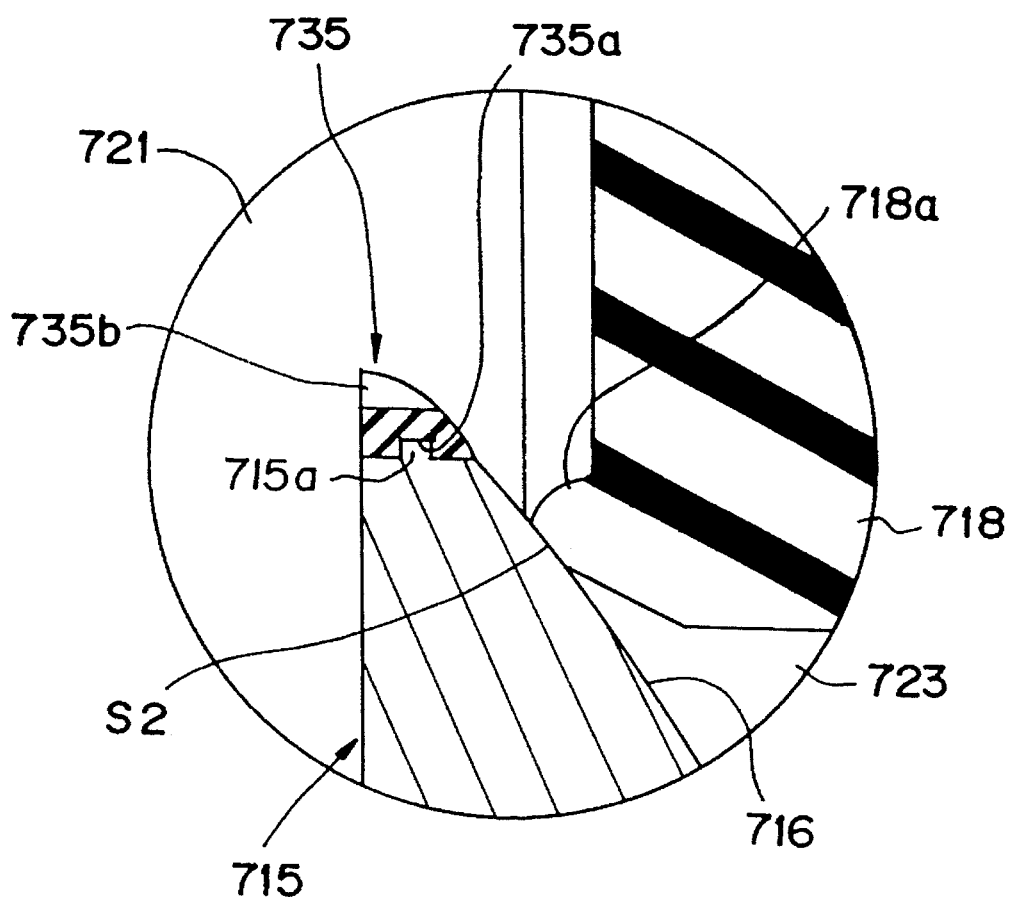
FIG. 12 is a cross section of part of still another embodiment of the invention.

FIG. 12 shows still another embodiment in which a valve plunger 715 is in the form of a solid cylinder around its outer periphery beyond a second valve seat 716, and an annular projection 715a is centrally formed in the outer peripheral surface for engagement with an annular groove formed in the inner peripheral surface of a ring-shaped member 735 which is formed of synthetic resin, thus integrally securing the member 735 around the outer periphery of the valve plunger 715. The outer peripheral surface of the ring-shaped member 735 is formed with a plurality of fin-shaped projections 735b which are spaced apart by a given distance in a circumferential direction. In this manner, an uneven surface is formed around the outer periphery of the valve plunger 715 at a location radially outward of a second seat $S_2$ and facing a variable pressure passage 721, the unevenness being defined by gaps formed between circumferentially adjacent fin-shaped projections 735b. In other respects, the arrangement is similar to the embodiment shown in FIG. 10, and corresponding parts are designated by like numerals as used before, to which 100 is added. Again, a similar functioning is achieved as described with previous embodiments.

While the invention has been illustrated and described above in connection with several embodiments thereof, it should be understood that a number of changes, modifications and substitutions therein will readily occur to one skilled in the art without departing from the scope and spirit of the invention defined by the appended claims.

What is claimed is:

1. In a booster including a tubular valve body slidably disposed within a shell, an annular first valve seat formed on an inner peripheral surface of the valve body, a valve plunger slidably fitted in the valve body, an annular second valve seat formed on the valve plunger, a valve element disposed within the valve body and urged by a spring so as to be seated upon either the first or the second valve seat in contact therewith, a constant pressure passage for providing a communication between a region which is located radially outward of a first seat defined by the contact between the first valve seat and the valve element and a constant pressure chamber which is partitioned within the shell, a pressure passage for providing a communication between a source of pressure fluid and a region which is located radially inward of a second seat defined by the contact between the second valve seat and the valve element, and a variable pressure passage for providing a communication between a region located intermediate the first seat and the second seat and a variable pressure chamber which is partitioned within the shell, said valve plunger including an annular flange which defines said second valve seat and a reduced diameter portion disposed forwardly adjacent said annular flange; the improvement comprising a muffler for the booster wherein an inner surface of the variable pressure passage is formed with an uneven surface, said uneven surface defined by a plurality of annular grooves formed on an outer peripheral surface of said annular flange forwardly of said second valve seat.

2. A muffler according to claim 1 in which the plurality of annular grooves is formed in the outer periphery of the valve plunger which faces the variable pressure passage in a region radially outward of the second seat.

3. A brake booster comprising:
    a shell having at least one constant pressure chamber, at least one variable pressure chamber and a valve-receiving chamber;
    a tubular valve body assembly slidably disposed within said valve-receiving chamber of said shell, said valve body having a plunger-receiving chamber which includes an inner peripheral surface defining an annular first valve seat;
    a valve plunger unit having at least a first end portion slidably received within said plunger-receiving chamber of said valve body, a second end portion having an annular flange which defines an annular second valve seat, and a reduced diameter portion disposed forwardly adjacent said annular flange, said second valve seat spaced radially inwards of said first valve seat to define an annular passage therebetween, said valve plunger unit being slidable in an axial direction between a first position and a second position;
    a valve element disposed within said valve body and having a biasing means operatively engaged therewith for maintaining said valve element in sealing contact with said second valve seat when said valve unit is in said first position and in sealing contact with said first valve seat when said valve plunger unit is in said second position;
    a pressure passage in communication with a pressure source;
    a constant pressure passage in communication with a radially outward side of said first valve seat and said constant pressure chamber; and
    a variable pressure passage in communication with said annular passage and said variable pressure chamber, said variable pressure passage being in communication with said constant pressure passage through said annular passage when said valve element is in sealing contact with said second valve seat and being in communication with said pressure passage through said annular passage when said valve element is in sealing contact with said first valve seat, said variable pressure passage having an inner passage surface having at least a portion of which that is defined by said inner peripheral surface of said valve body assembly and an exterior surface of said reduced diameter portion and said annular flange of said valve plunger unit, said inner passage surface defining a flow path along which pressure fluid flows into said variable pressure chamber and including muffler means along said flow path for rectifying said fluid flow to reduce sound generated thereby, said muffler means being formed on said annular flange and including a plurality of grooves on said exterior surface of said annular flange to define an uneven surface portion about said annular flange, said grooves extending in a direction oriented transverse to said flow path.

4. The brake booster according to claim 3, wherein said grooves of said uneven surface portion extend annularly.

5. The brake booster according to claim 3, wherein said grooves extend annularly about said annular flange.

6. The brake booster according to claim 5, wherein said grooves are disposed radially inwardly of said first valve seat and outwardly of said second valve seat.

7. The brake booster according to claim 3, wherein said grooves are disposed radially inwardly of said first valve seat and outwardly of said second valve seat.

8. A brake booster comprising a shell having a constant pressure chamber and a variable pressure chamber, a tubular valve body which is slidably disposed within the shell and has a rearward end portion which defines an annular first valve seat formed on an inner peripheral surface of the valve body, a valve plunger slidably fitted in the valve body which has a rearward portion defining an annular second valve seat on an arcuate rearward facing surface thereof and has a reduced diameter portion disposed forwardly adjacent said rearward portion, a valve element which is disposed within the valve body and urged by biasing means so as to be seated upon either the first or the second valve seat in contact therewith such that a first seat is defined by the contact between the first valve seat and the valve element and a second seat is defined by the contact between second valve seat and the valve element, a constant pressure passage in communication with the constant pressure chamber and an outer region located radially outward of the first seat, a pressure passage in communication with a source of pressure fluid and a region located radially inward of the second seat, and a variable pressure passage in communication with the variable pressure chamber and a region located intermediate the first seat and the second seat, said reduced diameter portion defining at least a portion of said variable pressure passage, said pressure passage and said variable pressure passage defining a flow path for a flow of pressure fluid successively inner and through the intermediate regions into the variable pressure chamber when said valve element is seated on said first valve seat, muffler means being disposed along said flow path on said valve plunger for rectifying the fluid flow to reduce sound generated thereby, said muffler means comprising a plurality of annular grooves formed on an outer peripheral surface of said rearward plunger end portion which are disposed forwardly of said second seal seat and rearwardly of said reduced diameter portion.

* * * * *